US011005325B2

(12) United States Patent
Tamura et al.

(10) Patent No.: US 11,005,325 B2
(45) Date of Patent: May 11, 2021

(54) ROTATING ELECTRIC MACHINE, STATOR OF ROTATING ELECTRIC MACHINE, AND COMPRESSOR

(71) Applicant: Mitsubishi Electric Corporation, Tokyo (JP)

(72) Inventors: Yuki Tamura, Tokyo (JP); Kazuhiro Shono, Tokyo (JP); Yusuke Nakagawa, Tokyo (JP); Ryohei Uno, Tokyo (JP); Keisuke Kato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 150 days.

(21) Appl. No.: 16/099,509

(22) PCT Filed: Jul. 8, 2016

(86) PCT No.: PCT/JP2016/070302
§ 371 (c)(1),
(2) Date: Nov. 7, 2018

(87) PCT Pub. No.: WO2018/008150
PCT Pub. Date: Jan. 11, 2018

(65) Prior Publication Data
US 2019/0131844 A1 May 2, 2019

(51) Int. Cl.
*H02K 3/52* (2006.01)
*H02K 3/50* (2006.01)
(Continued)

(52) U.S. Cl.
CPC ......... *H02K 3/522* (2013.01); *C10M 171/008* (2013.01); *F25B 31/002* (2013.01);
(Continued)

(58) Field of Classification Search
CPC .... H02K 3/38; H02K 3/50; H02K 3/52–3/522
See application file for complete search history.

(56) References Cited

U.S. PATENT DOCUMENTS 6,091,172 A 7/2000 Kakinuma et al.
2014/0335721 A1 11/2014 Tamamura et al.

FOREIGN PATENT DOCUMENTS

JP H09-312948 A 12/1997
JP H11-103551 A 4/1999
(Continued)

OTHER PUBLICATIONS

Japanese Office Action dated Oct. 15, 2019 in the corresponding JP patent application No. 2018-525915 (and English translation).
(Continued)

*Primary Examiner* — Ramon M Barrera
(74) *Attorney, Agent, or Firm* — Posz Law Group, PLC (57) ABSTRACT

Provided is a stator of a rotating electric machine including: a stator core; windings of multiple phases wound around the stator core via insulators attached to the stator core; and tab terminals that each have at least one slit and a plate-shaped tab and that electrically connect an end portion of a winding, of one of the multiple phases, of the windings to an end portion of an other of the windings of a different one of the multiple phases, wherein a portion of each of the insulators or a resin component different from the insulators has a connection terminal insertion hole into which the tab terminal is inserted, and the connection terminal insertion hole is formed on a circle centered on a shaft center of the stator, and a plate surface of the tab of the tab terminal to be inserted into the connection terminal insertion hole is placed to be tangential to the circle.

16 Claims, 5 Drawing Sheets

(51) Int. Cl.
*H02K 3/38* (2006.01)
*H01R 4/2429* (2018.01)
*C10M 171/00* (2006.01)
*F25B 31/00* (2006.01)
*H02K 3/18* (2006.01)

(52) U.S. Cl.
CPC ............ *H01R 4/2429* (2013.01); *H02K 3/18* (2013.01); *H02K 3/38* (2013.01); *H02K 3/50* (2013.01); *H02K 3/52* (2013.01)

(56) References Cited

FOREIGN PATENT DOCUMENTS

| | | |
|---|---|---|
| JP | 3712119 B2 | 11/2005 |
| JP | 4271003 B2 | 6/2009 |
| JP | 5679833 B | 3/2015 |
| WO | 2014/181377 A1 | 11/2014 |
| WO | 2015-136980 A1 | 9/2015 |

OTHER PUBLICATIONS

Office Action dated Mar. 3, 2020 issued in corresponding JP patent application No. 2018-525915 (with English Translation).
International Search Report of the International Searching Authority dated Oct. 4, 2016 for the corresponding international application No. PCT/JP2016/070302 (and English translation).

ROTATING ELECTRIC MACHINE, STATOR OF ROTATING ELECTRIC MACHINE, AND COMPRESSOR

CROSS REFERENCE TO RELATED APPLICATION

This application is a U.S. national stage application of PCT/JP2016/070302 filed on Jul. 8, 2016, the contents of which are incorporated herein by reference.

TECHNICAL FIELD

The present invention relates to a rotating electric machine including a stator, the stator of the rotating electric machine, and a compressor including the rotating electric machine.

BACKGROUND ART

A refrigeration cycle apparatus such as an air-conditioning device having a refrigeration cycle includes a compressor as a constituent component. Such a compressor usually includes a rotating electric machine (electric motor) as a driving mechanism for compressing fluid. The rotating electric machine includes a rotor that is attached to a rotating shaft and can be rotationally driven together with the rotational shaft and a stator spaced apart from the periphery of the rotor. To reduce the power consumption of a rotating electric machine and improve productivity, recent years have seen an increase in employment of a concentrated-winding stator. In the concentrated-winding stator, windings are wound around split laminated core segments via insulators attached to the stator core segments, and the laminated cores around which the windings are wound are connected together.

In such a concentrated-winding stator, connections are made so that each winding produces a rotating magnetic field. In addition, in the concentrated-winding stator, by connecting the end portions (neutral-point-side lead wire, power-supply-side lead wire) of a winding to the end portions of another winding, a neutral point and input lines (U phase, V phase, W phase) are formed. As a way of connecting windings at a neutral point, connection terminals are used (e.g., see Patent Literature 1). It should be noted that such a connection terminal is inserted into a connection terminal insertion hole formed on the external wall side of an insulator and fixed. As a way of inserting a connection terminal into a connection terminal insertion hole, automatic insertion equipment specially designed in accordance with the shape of each terminal is commonly used.

CITATION LIST

Patent Literature

Patent Literature 1: Japanese Patent No. 5679833

SUMMARY OF INVENTION

Technical Problem

In the stator in Patent Literature 1, a connection terminal on the winding start side may be placed to be parallel to a winding, and a connection terminal on the winding end side may be placed to be perpendicular to the winding. However, with the above configuration, it is necessary for a dedicated automatic insertion machine to insert a connection terminal in accordance with the orientation of the connection terminal to be placed. Thus, the automatic insertion machine requires a mechanism or a system that enables multiple-axis control, which results in an increase in running costs of the equipment.

The present invention has been made to overcome the above problems, and an objective of the present invention is to provide a rotating electric machine, the stator of the rotating electric machine, and a compressor that are capable of suppressing running costs of equipment used in manufacturing processes thereof.

Solution to Problem

A stator of a rotating electric machine according to an aspect of the present invention includes: a stator core; windings of multiple phases wound around the stator core via insulators attached to the stator core; and tab terminals that each have at least one slit and a plate-shaped tab and that electrically connect an end portion of a winding, of one of the multiple phases, of the windings to an end portion of an other of the windings of a different one of the multiple phases, wherein a portion of each of the insulators or a resin component different from the insulators has a connection terminal insertion hole into which the tab terminal is inserted, and the connection terminal insertion hole is formed on a circle centered on a shaft center of the stator, and a plate surface of the tab of the tab terminal to be inserted into the connection terminal insertion hole is placed to be tangential to the circle.

Advantageous Effects of Invention

For a rotating electric machine, the stator of the rotating electric machine, and a compressor according to an aspect of the present invention, connection terminal insertion holes are formed on a circle centered on the shaft center of the stator, and the plate surfaces of the tabs of tab terminals to be inserted into the holes are placed to be tangential to the circle. This enables the connection terminals to assume the same orientation. Accordingly, the mechanism or system of an automatic insertion machine for inserting the connection terminals can be simplified, which can suppress running costs.

DESCRIPTION OF EMBODIMENTS

Embodiment 1

Figure 1:
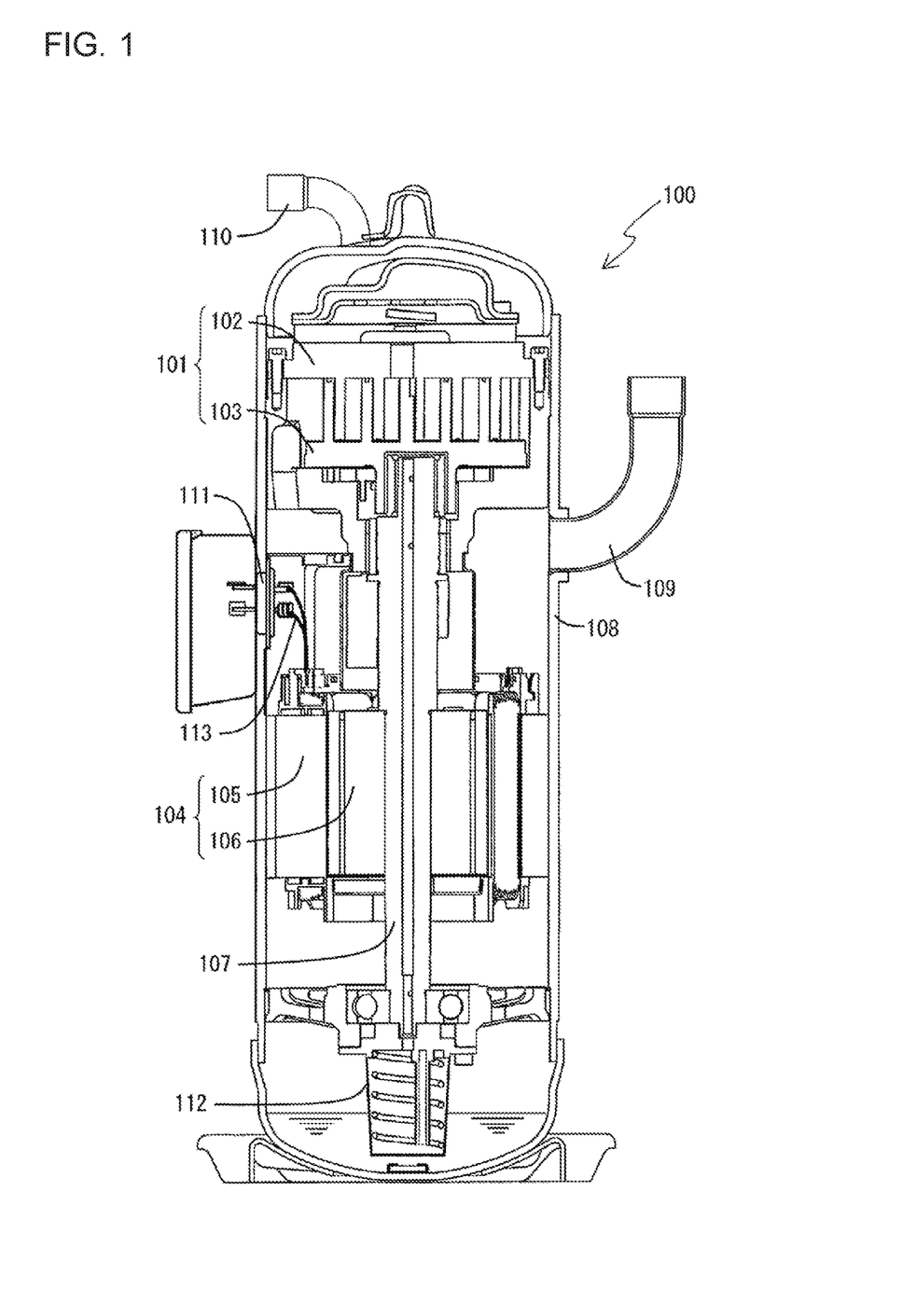
FIG. 1 is a profile of a compressor that includes a stator according to Embodiment 1 of the present invention.

FIG. 1 is a vertical profile of a compressor that includes a stator according to Embodiment 1 of the present invention. Hereinafter, with reference to FIG. 1, the configuration of a compressor 100 is described. The compressor 100 in FIG. 1 is what is called a vertical scroll compressor and, for example, compresses and discharges a working medium such as refrigerant. The compressor 100 includes an airtight container 108, a compression mechanism 101, a rotating electric machine 104, and a rotating shaft 107. The airtight container 108 stores lubricant in a bottom portion and serves as the outer shell of the compressor 100. The compression mechanism 101 is housed in the airtight container 108 and compresses refrigerant. The rotating electric machine 104 drives the compression mechanism 101. The rotating shaft 107 connects the rotating electric machine 104 and the compression mechanism 101 to each other.

The airtight container 108 is, for example, cylindrical and is pressure resistant. A suction pipe 109 for taking a working medium into the airtight container 108 connects to the side surface of the airtight container 108. A discharge pipe 110 for discharging a compressed working medium to the outside of the airtight container 108 connects to the top of the airtight container 108. The airtight container 108 houses the compression mechanism 101, the rotating electric machine 104, the rotating shaft 107, and an oil pump 112.

The compression mechanism 101 compresses fluid (such as refrigerant) sucked into the airtight container 108 through the suction pipe 109 and includes an orbiting scroll 103 and a fixed scroll 102. A compression space is formed between the spiral portion of the orbiting scroll 103 and the spiral portion of the fixed scroll 102. For instance, a single component refrigerant of HFO-1123 or a mixed refrigerant containing HFO-1123 is used as refrigerant.

Figure 2:
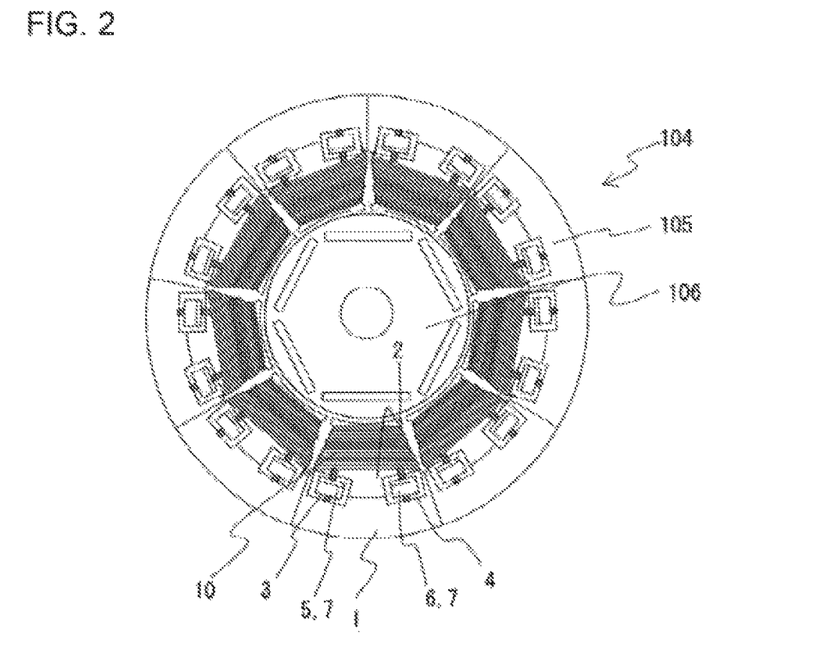
FIG. 2 is a schematic plan view of a rotating electric machine that includes the stator according to Embodiment 1 of the present invention.

FIG. 2 is a schematic plan view of a rotating electric machine that includes the stator according to Embodiment 1 of the present invention. The rotating electric machine 104 drives the rotating shaft 107 to rotate, has a stator 105 and a rotor 106, and generates torque. The rotor 106 is fixed to the rotating shaft 107 by, for example, shrink fitting, and the stator 105 is fixed to the airtight container 108 by, for example, shrink fitting. A lead wire 113 connects to the stator 105 and to a sealing terminal 111 provided in the airtight container 108 to receive power from the outside of the airtight container 108. When the stator 105 receives power, the rotating shaft 107 and the rotor 106 rotate relative to the stator 105. The rotating electric machine 104 is, for example, a brushless DC motor. The rotating electric machine 104 is a permanent-magnetic motor. However, the rotating electric machine 104 may be another type of motor such as an electromagnetic motor, a reluctance motor, or a hysteresis motor.

The rotating shaft 107 transmits torque generated by the rotating electric machine 104 to the compression mechanism 101. The inside of the rotating shaft 107 has an oil supply passage that extends from an end portion of the rotating shaft 107 in the axial direction. The oil supply passage is open in the end portion of the rotating shaft 107 in the axial direction, and oil to which the oil pump 112 has applied pressure is supplied through the opening of the oil supply passage. The upper end of the rotating shaft 107 has an eccentric shaft portion that engages with an orbiting bearing formed in the boss of the orbiting scroll 103. The oil pump 112 is attached to the lower end of the rotating shaft 107.

The oil pump 112 is attached to the other end of the rotating shaft 107 and suctions oil stored in the oil storage space in the airtight container 108 and then supplies the oil to the oil supply passage in the rotating shaft 107. The oil supplied to the oil supply passage is supplied to each sliding element.

Figure 3:
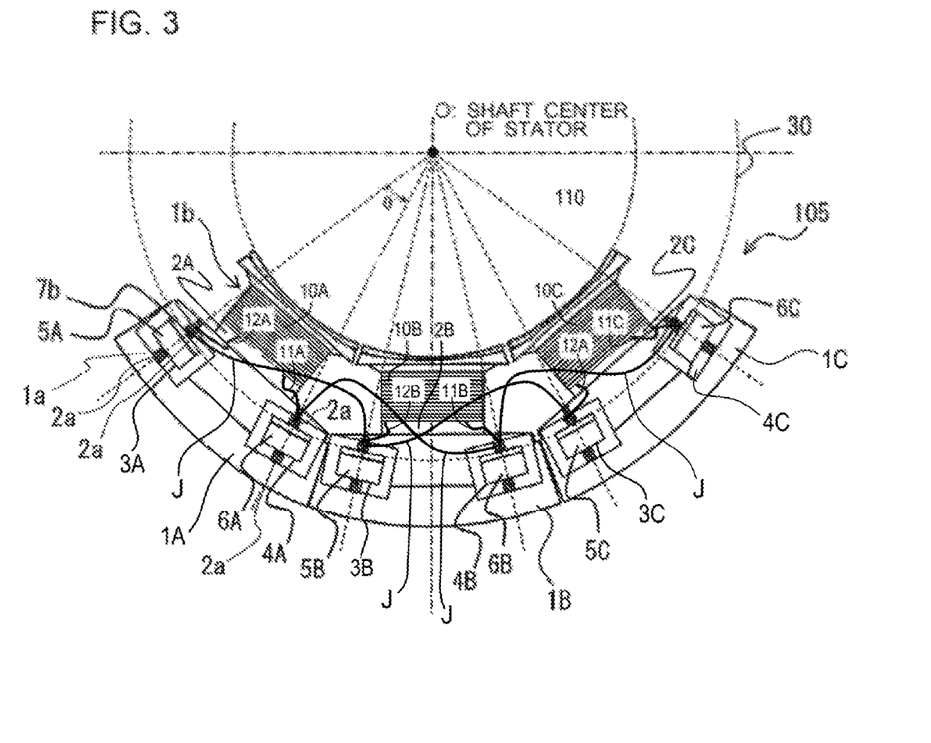
FIG. 3 is a schematic partial plan view of the stator according to Embodiment 1 of the present invention.

FIG. 3 is a schematic partial plan view of the stator according to Embodiment 1 of the present invention. The stator 105 is described with reference to FIGS. 2 and 3. The stator 105 includes stator core segments 1, windings 10 of multiple phases, and tab terminals 7. The windings 10 of multiple phases are wound around the stator core segments 1 via an insulator 2 intervening between the winding 10 and each of the stator core segments 1. The tab terminals 7 each have at least one slit 7a and a plate-shaped tab 7b and electrically connect both end portions of the winding 10 of one of the multiple phases to both end portions of the winding 10 of a different one of the multiple phases. In the stator 105, each of the stator core segments 1 that is substantially T-shaped are annularly combined and arranged in the circumferential direction. In a state in which the stator core segments 1 are annularly combined, there is a predetermined gap between adjacent tooth portions 1b. In the stator 105, the tab terminals 7 are provided as one on the neutral point side of each phase and one on the input line side of each phase. A neutral point of the windings 10 of three phases (U phase, V phase, W phase) is formed by connecting the tabs 7b of the tab terminals 7 to each other by using jumper wires.

The stator core 1 is made of laminated sheet steel that contains a highly permeable magnetic material such as iron. The stator core 1 has a back yoke 1a in the periphery and the tooth portion 1b that is T-shaped and that projects inwardly from the center of the back yoke 1a in the radial direction of the stator core 1. To insulate the tooth portion 1b of the stator core 1, the insulators 2, which are insulating materials, are provided on the top end and bottom end of the tooth portion 1b in the cylindrical axial direction. The winding 10 is wound around the tooth portion 1b of the stator core 1 in a concentrated manner via the insulators 2 attached to the stator core 1. It should be noted that in FIG. 3, the stator core on the left side corresponds to a stator core 1A, the stator core in the center corresponds to a stator core 1B, and the stator core on the right side corresponds to a stator core 1℃. Since the stator core 1A, the stator core 1B, and the stator core 1℃ have the same structure, only the structure of the stator core 1A is described, and explanations for the stator core 1B and stator core 1℃ are omitted. Hereinafter, other components to which reference symbols A to C are assigned are treated in the same manner.

One end of a winding 10A serves as an input-line-side lead wire that connects to a power supply, whereas the other end of the winding 10A serves as a neutral-point-side lead wire that connects to a neutral point. The neutral-point-side lead wires of the winding 10A and other windings of the respective phases are connected to form a Y connection. In FIG. 3, the input-line-side lead wire is described as a winding start wire 11A, and the neutral-point-side lead wire is described as a winding end wire 12A. It should be noted that the winding 10A in FIG. 3 shows only portions relating to terminal connections on the input line side and on the neutral point side, and FIG. 3 does not show a state in which the winding 10A is wound in a concentrated manner. As the configurations of a winding 10B and a winding 100 are the same as the configuration of the winding 10A, explanations are omitted.

The insulators 2 are made of resin and are attached to the stator core 1. The insulators 2 are attached to the stator core 1 so that the back yoke 1a and an end portion of the tooth portion 1b in the stator core 1 are exposed. For instance, two insulators 2 are inverted and sandwich the stator core 1 from above and below, thereby attaching the insulators 2 to the stator core 1. However, two insulators 2 do not have to sandwich the stator core 1. Instead, one insulator 2 may be attached to the stator core 1, for example. The end face of the insulator 2 (surface shown in the plan views of FIGS. 2 and 3) has a neutral-point-side connection terminal insertion hole 3 and an input-line-side connection terminal insertion hole 4 into which the tab terminals 7 are to be inserted. It should be noted that the neutral-point-side connection terminal insertion hole 3 and the input-line-side connection terminal insertion hole 4 may be formed in a resin component different from the insulator 2. An insulator other than the insulator 2, such as a resin molded article can be used in a stator that does not have the insulator 2.

The positions of the neutral-point-side connection terminal insertion hole 3 and the input-line-side connection terminal insertion hole 4 in the end face of the insulator 2 (surface shown in the plan views of FIGS. 2 and 3) are described. A neutral-point-side connection terminal insertion hole 3A and an input-line-side connection terminal insertion hole 4A in the end face of an insulator 2A are formed on circles centered on a shaft center O of the stator 105. More preferably, the neutral-point-side connection terminal insertion hole 3A and the input-line-side connection terminal insertion hole 4A should be formed on a first circle 30, that is, on the same circle centered on the shaft center O of the stator 105. An insulator 2B adjacent to the insulator 2A (insulator 2 adjacent to the insulator 2A, on the right side of the insulator 2A in FIG. 1) and an insulator 2C (insulator 2 adjacent to the insulator B, on the right side of the insulator B in FIG. 1) are formed in the same manner. Since the stator core segments 1A to 10 are all arranged on the same circle, neutral-point-side connection terminal insertion holes 3A to 3C and input-line-side connection terminal insertion holes 4A to 4C are all formed on the same circle.

The tab terminal 7 is inserted into the neutral-point-side connection terminal insertion hole 3 to function as a neutral-point-side tab terminal 5. The tab terminal 7 is inserted into the input-line-side connection terminal insertion hole 4 to function as an input-line-side tab terminal 6. Thus, a neutral-point-side tab terminal 5A and an input-line-side tab terminal 6A pair is provided in the stator core 1A. Similarly, a neutral-point-side tab terminal 5B and an input-line-side tab terminal 6B pair is provided in the stator core 1B. A neutral-point-side tab terminal 5C and an input-line-side tab terminal 6C pair is provided in the stator core 10.

A pair of grooves 2a used for placing the winding 10 is formed in portions of side surfaces of each of the neutral-point-side connection terminal insertion hole 3 and the input-line-side connection terminal insertion hole 4, the side surfaces being opposite to each other. The pair of grooves 2a is formed in a radial direction of a circle centered on the shaft center O of the stator 105. That is, the neutral-point-side connection terminal insertion hole 3 and the input-line-side connection terminal insertion hole 4 each have a pair of grooves 2a formed to be perpendicular to the plate surface of the tab 7b of the tab terminal 7. In FIG. 3, the neutral-point-side connection terminal insertion hole 3 and the input-line-side connection terminal insertion hole 4 each have a pair of grooves 2a. However, two or more pairs of grooves 2a may be formed in the circumferential direction of the stator 105.

It should be noted that although the height direction of the neutral-point-side connection terminal insertion hole 3 and the input-line-side connection terminal insertion hole 4 is not mentioned, the two holes may have the same height or different heights. If there is a difference in height, although attention must be paid to the necessity to provide a movable shaft in the axial direction of the stator as a mechanism of an automatic terminal insertion machine, it is possible to avoid interference between the jumper wire on the neutral point side and the lead wire 113 on the input line side. Accordingly, an effect of improved work efficiency of wiring and wire arrangement can be obtained. The effect can be obtained sufficiently by setting the difference in height to be equal to or greater than the height of the flag terminal for the jumper wire or the lead wire 113 to be attached to the tab 7b of the tab terminal 7.

Figure 4:
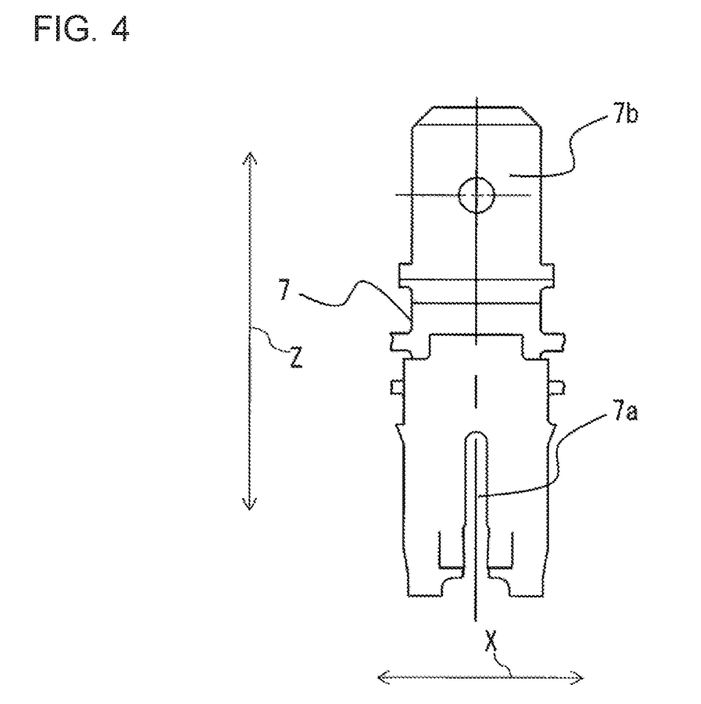
FIG. 4 is a front view of a tab terminal to be inserted into the stator according to Embodiment 1 of the present invention.
Figure 5:
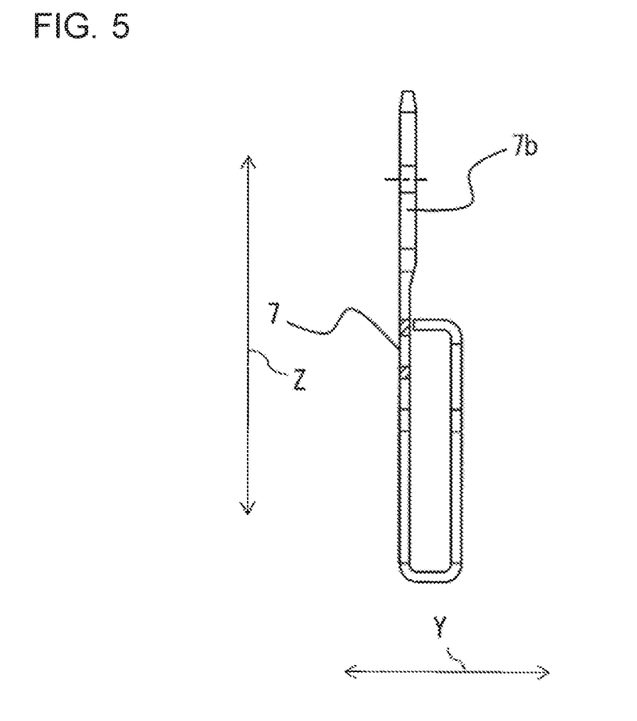
FIG. 5 is a side view of the tab terminal to be inserted into the stator according to Embodiment 1 of the present invention.

FIG. 4 is a front view of the tab terminal to be inserted into the stator according to Embodiment 1 of the present invention. FIG. 5 is a side view of the tab terminal to be inserted into the stator according to Embodiment 1 of the present invention. The tab terminal 7 is plate-shaped, and a bottom portion thereof has the slit 7a that extends vertically (Z-axis). If the tab terminal 7 is made by bending a thin plate as shown in FIG. 5, two slits 7a are made, one in a portion of a front-side portion and one in a portion of a back-side portion, to be opposite to each other. A top portion of the tab terminal 7 has the tab 7b that is plate-shaped, to connect with the lead wire 113 or the jumper wire as a neutral-point connecting wire. The jumper wire or the lead wire 113 is connected to the tab terminal 7 by inserting a flag terminal provided in the jumper wire or the lead wire 113 into the tab 7b. It should be noted that the shape of the tab terminal 7 is not limited to a shape as shown in FIGS. 4 and 5, but a terminal having a similar function may be used as the tab terminal 7. For instance, the terminal portion of the tab terminal 7 may be made of a thick plate. In this instance, the number of the slits 7a is one. Although the constituent material of the tab terminal 7 is not particularly described, a conductor (such as copper, a copper alloy, aluminum, an aluminum alloy, iron, or an iron alloy) can be employed as a constituent material. Although the tab terminal 7 has one slit 7a, two or more slits 7a that extend vertically (Z-axis) may be formed in the width direction of the plate (X-axis).

The tab terminals 7 are inserted into the neutral-point-side connection terminal insertion hole 3 and the input-line-side connection terminal insertion hole 4 and arranged so that the plate surfaces of the tabs 7b of the tab terminals 7 are tangential to the first circle 30, that is, the same circle centered on the shaft center O of the stator 105. The neutral-point-side connection terminal insertion hole 3 and the input-line-side connection terminal insertion hole 4 are formed so that every angle θ between the tab terminal 7 inserted into the neutral-point-side connection terminal insertion hole 3 and the tab terminal 7 inserted into the input-line-side connection terminal insertion hole 4 has the same degree measure (e.g., θ=360 degrees/(number of stator slots)/2).

Figure 6A:
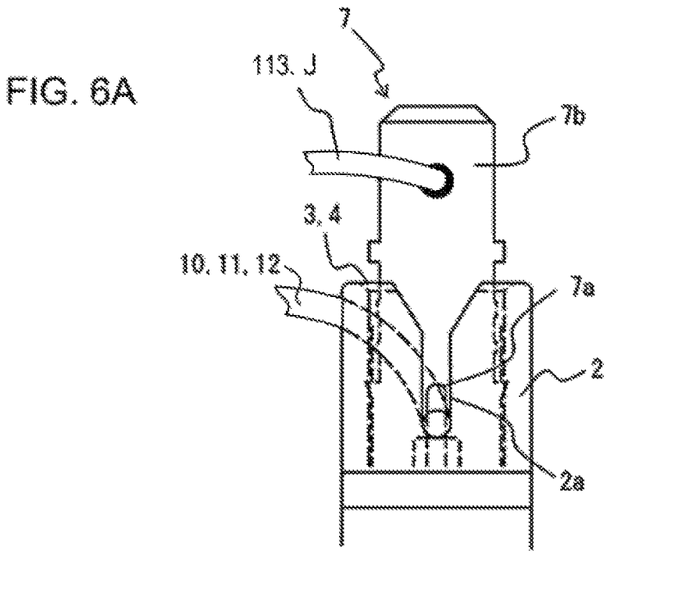
FIG. 6A is a schematic front view of an insertion portion of the tab terminal inserted into the stator according to Embodiment 1 of the present invention.
Figure 6B:
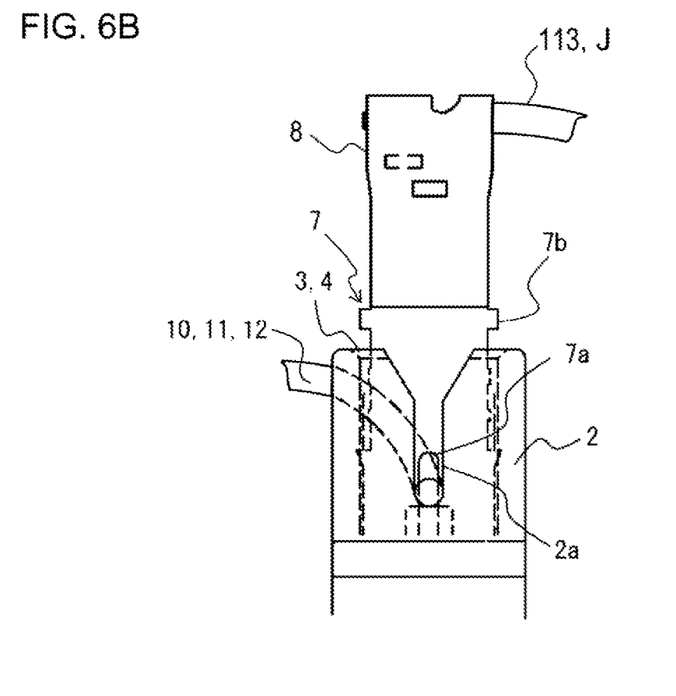
FIG. 6B is a schematic front view of the flag terminal inserted into the tab terminal according to Embodiment 1 of the present invention.
Figure 7:
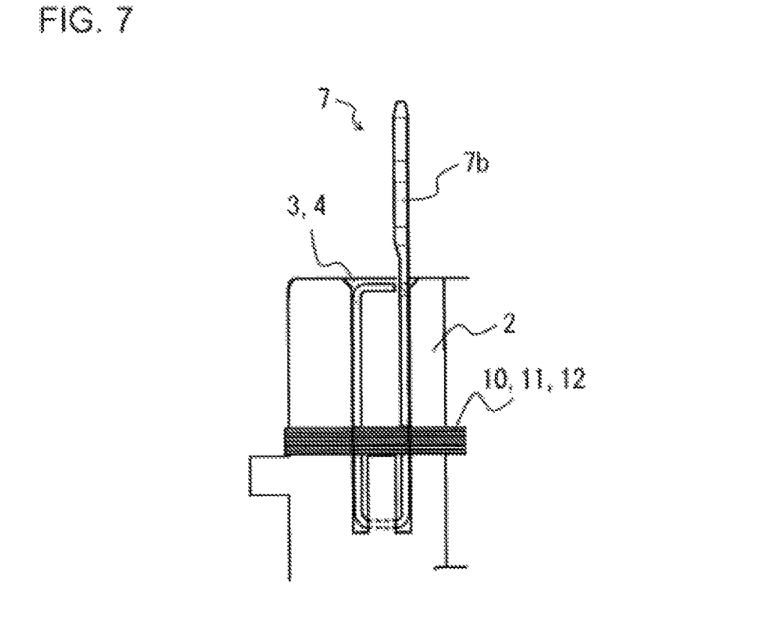
FIG. 7 is a schematic side view of the insertion portion of the tab terminal inserted into the stator according to Embodiment 1 of the present invention.

FIG. 6A is a schematic front view of an insertion portion of the tab terminal 7 inserted into the stator according to Embodiment 1 of the present invention. FIG. 6B is a schematic front view of the flag terminal 8 inserted into the tab terminal 7 where the tab terminal 7 is inserted into the stator according to Embodiment 1 of the present invention. FIG. 7 is 30 a schematic side view of the insertion portion of the tab terminal inserted into the stator according to Embodiment 1 of the present invention. Next, a connection between the winding end wire 12 on the neutral point side and the jumper wire and a connection between the winding start wire 11 on the input line side and the lead wire 113 are described.

An end portion of the winding end wire 12 on the neutral point side in the stator core 1 is placed in the groove 2a that is formed in a side wall of side walls surrounding the neutral-point-side connection terminal insertion hole 3 formed in the insulator 2. When the tab terminal 7 is inserted into the neutral-point-side connection terminal insertion hole 3, the winding end wire 12 placed in the groove 2a fits into the slit 7a. The winding end wire 12A, the winding end wire 12B, and the winding end wire 12C, on the neutral point side, of the respective phases are then connected via the tab terminals 7 of the respective phases. For instance, as shown in FIGS. 6A, and 6B, jumper wires J are connected to the tabs 7b of the tab terminals 7, thereby interconnecting the winding end wire 12A, the winding end wire 12B, and the winding end wire 12C. As shown in FIG. 3, jumper wires J can be connected to the tabs 7b of the tab terminals 7 to interconnect the winding end wire 11A, the winding end wire 11B, and the winding end wire 11C. Accordingly, a neutral point of the respective phases can be formed.

The winding start wire 11 on the input line side in the stator core 1 is placed in the groove 2a that is formed in a side wall of side walls surrounding the input-line-side connection terminal insertion hole 4 formed in the insulator 2. When the tab terminal 7 is inserted into the input-line-side connection terminal insertion hole 4, the winding start wire 11 placed in the groove 2a fits into the slit 7a. As a way of connecting the lead wire 113 and the winding start wire 11 on the input line side, the tab terminal 7 having at least one slit 7a and the tab 7b to which a flag terminal is to be connected is used, the winding start wire 11 is inserted into the slit 7a, and the flag terminal of the lead wire 113 is connected to the tab 7b, thereby connecting the lead wire 113 and the winding start wire 11. Specifically, the winding start wire 11A, the winding start wire 11B, and the winding start wire 110 of the respective phases are connected to the tab terminals 7 of the respective phases. A connection with an external power supply is made via the lead wire 113 connected to the tab 7b of the tab terminal 7.

An excess portion of the winding 10 is cut at an appropriate position. If there is an excess portion of the winding 10, a cut end of the conductor is exposed. Thus, if the cut end is left as it is, there is a risk that the cut end approaches and comes into contact with, for example, a metal frame or an oil pipe not shown in the drawings. Accordingly, the excess portion of the winding 10 is to be cut so that an appropriate insulation distance from the exposed portion of the conductor is maintained.

As such, for the stator 105 according to Embodiment 1 of the present invention, the plate-shaped tabs 7b of the tab terminals 7 are prearranged on the same circle, and the plate surfaces of the tabs 7b are placed to be tangential to the circle. With this configuration, an automatic terminal insertion machine can be standardized or simplified even if the automatic terminal insertion machine has required a dedicated design or a complex mechanism or system in accordance with the orientation, type, and size of the connection terminal. Accordingly, a versatile stator capable of suppressing running costs of equipment can be made.

The plate-shaped tabs 7b of the tab terminals 7 are prearranged on the same circle, and the plate surfaces of the tabs 7b are placed to be tangential to the circle. Accordingly, work efficiency improves in the process of attaching the jumper wires and the lead wires to the tabs 7b of the tab terminals 7 and arranging these wires annularly, and it is possible to reduce a load applied to each of the jumper wires and the lead wires when the arranged wires are fixed. Conductor and coating reliability can be ensured more reliably.

Here, when connecting wires and a connection terminal of a conventional stator, a winding and a jumper wire, that is, more than one wire may be inserted into one slit of the connection terminal. For this configuration, poor contacting between the terminal and the winding and between the terminal and the jumper wire may occur. In view of, in particular, a recent trend of refrigerant, a measure to suppress a rise in the internal temperature of a compressor is called for. When a winding is thickened as a way of decreasing copper loss, which is an effective way of suppressing heat generation of a motor, the way of connecting wires and a connection terminal described above may result in poor contacting. Moreover, for a winding having a large wire diameter, the winding is hard, and thus wiring may be difficult.

However, for the stator 105 according to Embodiment 1 of the present invention, the winding 10 is inserted into the slit 7a, and the jumper wire or the lead wire is attached to the tab 7b. Thus, even if a winding having a large wire diameter is used, it is possible to reliably connect the connection terminal and the winding and connect the connection terminal and the jumper wire. Moreover, by inserting the winding 10 into the slit 7a and by attaching the jumper wire or the lead wire to the tab 7b, a load applied to each wire can be reduced, and conductor and coating reliability can be ensured more reliably.

The neutral-point-side connection terminal insertion hole 3 and the input-line-side connection terminal insertion hole 4 are formed so that every angle θ between the tab terminals 7 inserted into the neutral-point-side connection terminal insertion hole 3 and the input-line-side connection terminal insertion hole 4 has the same degree measure (e.g., θ=360 degrees/(number of stator slots)/2). By doing so, it is possible to further simplify control performed by the automatic terminal insertion machine.

Embodiment 2

Figure 8:
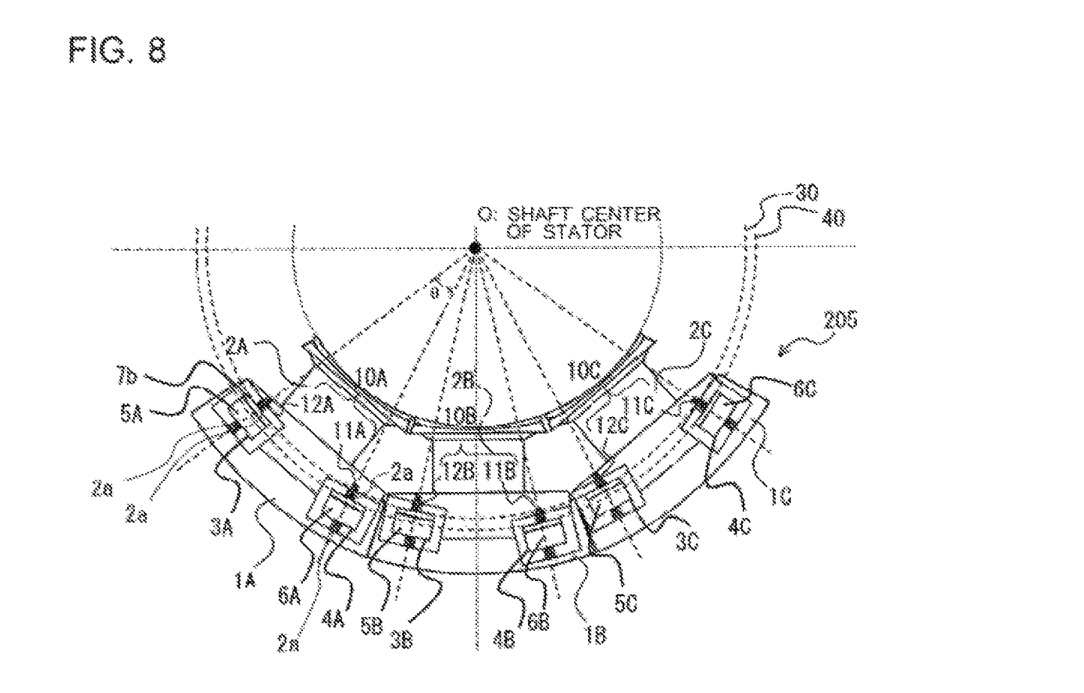
FIG. 8 is a schematic plan view of a stator according to Embodiment 2 of the present invention to explain connected portions of the stator.

FIG. 8 is a schematic plan view of a stator according to Embodiment 2 of the present invention to explain connected portions of the stator. It should be noted that differences from Embodiment 1 are mainly described in Embodiment 2. The same reference symbols are assigned to the same components and portions as those shown in FIGS. 1 to 7, and explanations are omitted.

In terms of the positions of a neutral-point-side connection terminal insertion hole 3 and an input-line-side connection terminal insertion hole 4 formed in the top surface of an insulator 2 (surface shown in the plan view of FIG. 8), a stator 205 according to Embodiment 2 of the present invention differs from the stator 105 according to Embodiment 1. Neutral-point-side connection terminal insertion holes 3A to 3C formed in the top surface of an insulator 2A are formed on a first circle 30 that is concentric with a stator 105 having a shaft center O. Meanwhile, input-line-side connection terminal insertion holes 4A to 4C are formed on a second circle 40 that is concentric with the stator 105 having the shaft center O. That is, the neutral-point-side connection terminal insertion hole 3 and the input-line-side connection terminal insertion hole 4 are not formed on the same circle. Here, by setting a radius difference between the first circle 30, on which the neutral-point-side connection terminal insertion hole 3 is formed, and the second circle 40, on which the input-line-side connection terminal insertion hole 4 is formed, to a length equal to or greater than the thickness of a flag terminal to be attached to a tab 7b of a tab terminal 7, interference between a jumper wire and a lead wire 113 can be reduced, and high work efficiency of wiring and wire arrangement can be ensured.

In addition, in the stator 205, an excess portion of winding 10 is cut at an appropriate position so that an appropriate insulation distance from an exposed portion of the conductor can be maintained. In either the neutral-point-side connection terminal insertion hole 3 or the input-line-side connection terminal insertion hole 4 that is formed on the outside diameter side of the stator 205, it is necessary to pay more attention to maintain an appropriate insulation distance when determining the position at which the winding 10 is cut.

As such, for the stator 205 according to Embodiment 2 of the present invention, the neutral-point-side connection terminal insertion hole 3 and the input-line-side connection terminal insertion hole 4 are formed on the circles having different diameters. Accordingly, it is possible to more effectively avoid interference between the jumper wire on the neutral point side and the lead wire on the input line side and further improve work efficiency of wiring and wire arrangement.

It should be noted that embodiments of the present invention are not limited to Embodiments 1 and 2 of the present invention described above, but various changes can be made to Embodiments 1 and 2. For instance, in the above examples, the stator has split iron cores around which windings are wound in a concentrated manner. However, the stator is not limited to such a stator, but the stator may have an integral iron core.

In the above examples, a connection terminal and the lead wire or the jumper wire are connected by inserting the flag terminal of the lead wire or the jumper wire into the tab 7b of the tab terminal 7. However, on conditions that sufficient current capacity is ensured and that strength endurable to, for example, vibration during operation is ensured, these components may be joined together by, for example, soldering or resistance welding.

Moreover, Embodiments 1 and 2 show an example in which the stator has a Y-connection structure, and an end portion of the winding is described as the neutral point side and the other end portion of the winding is described as the input line side. However, the stator is not limited to such a stator. In addition, in a case in which a stator has a delta-connection structure by connecting lead wires rather than jumper wires to neutral-point-side connection terminals, an effect similar to that obtained in the case in which the stator has the Y-connection structure can be obtained.

Moreover, in the above example, a vertical airtight scroll compressor is used as a compressor. However, a horizontal compressor may be employed. In addition, a vane compressor may be employed.

REFERENCE SIGNS LIST stator core 1A stator core 1B stator core 10 stator core 1a back yoke 1b tooth portion 2 insulator 2A insulator 2B insulator 2C insulator 2a groove 3 neutral-point-side connection terminal insertion hole 3A neutral-point-side connection terminal insertion hole 3B neutral-point-side connection terminal insertion hole 3C neutral-point-side connection terminal insertion hole 4 input-line-side connection terminal insertion hole 4A input-line-side connection terminal insertion hole 4B input-line-side connection terminal insertion hole 4C input-line-side connection terminal insertion hole 5 neutral-point-side tab terminal 5A neutral-point-side tab terminal 5B neutral-point-side tab terminal 5C neutral-point-side tab terminal 6 input-line-side tab terminal 6A input-line-side tab terminal 6B input-line-side tab terminal 6C input-line-side tab terminal 7 tab terminal 7a slit 7b tab 10 winding 10A winding 10B winding 100 winding 11A winding start wire 11B winding start wire 11C winding start wire 12A winding end wire 12B winding end wire 12C winding end wire 30 first circle 40 second circle 100 compressor 101 compression mechanism 102 fixed scroll 103 orbiting scroll 104 rotating electric machine 105 stator 106 rotor 107 rotating shaft 108 airtight container 109 suction pipe 110 discharge pipe 111 sealing terminal 112 oil pump 113 lead wire 205 stator

The invention claimed is:

1. A stator of a rotating electric machine comprising:
   a stator core;
   windings of multiple phases wound around the stator core via insulators attached to the stator core; and
   tab terminals each having at least one slit and a plate-shaped tab inserted into a flag receptacle and electrically connecting an end portion of a winding of one phase of the multiple phases of the windings to an end portion of another of the windings having a different phase from the one phase of the multiple phases,
   wherein a portion of each of the insulators or a resin component different from the insulators has a connection terminal insertion hole into which the tab terminal is inserted,
   the connection terminal insertion hole is formed on a circle centered on a shaft center of the stator, and a plate surface of the tab of the tab terminal inserted into the connection terminal insertion hole is tangential to the circle, and
   the at least one slit of the tab terminal is secured within the connection terminal insertion hole and the tab of the tab terminal protrudes from the connection terminal insertion hole.

2. The stator of a rotating electric machine of claim 1, wherein a plurality of the connection terminal insertion holes are formed on a same circle centered on the shaft center of the stator.

3. The stator of a rotating electric machine of claim 1, wherein the connection terminal insertion hole on a winding start side of the winding of each phase is formed on a first circle centered on the shaft center of the stator,
   the connection terminal insertion hole on a winding end side of the winding of each phase is formed on a second circle centered on the shaft center of the stator, and
   the first circle and the second circle have different diameters.

4. The stator of a rotating electric machine of claim 1, wherein portions of side walls surrounding the connection terminal insertion hole have at least a pair of grooves used for placing the winding, the side walls being opposite to each other, and the grooves are formed to be perpendicular to the plate surface of the tab of the tab terminal.

5. The stator of a rotating electric machine of claim 1, wherein an angle between
a line segment between the shaft center of the stator and a first connection terminal insertion hole of the connection terminal insertion holes on the winding start side, and
a line segment between the shaft center of the stator and a second connection terminal insertion hole of the connection terminal insertion holes on the winding end side
is same as an angle between
a line segment between the shaft center of the stator and a third connection terminal insertion hole of the connection terminal insertion holes on the winding start side, and
a line segment between the shaft center of the stator and a fourth connection terminal insertion hole of the connection terminal insertion holes on the winding end side.

6. The stator of a rotating electric machine of claim 1, wherein the connection terminal insertion hole on the winding start side and the connection terminal insertion hole on the winding end side have different heights.

7. A stator of a rotating electric machine comprising:
a stator core;
windings of multiple phases wound around the stator core via insulators attached to the stator core; and
tab terminals that each have at least one slit and a plate-shaped tab and that electrically connect an end portion of a winding, of one of the multiple phases, of the windings to an end portion of an other of the windings of a different one of the multiple phases, and
the connection terminal insertion hole is formed on a circle centered on a shaft center of the stator, and a plate surface of the tab of the tab terminal to be inserted into the connection terminal insertion hole is placed to be tangential to the circle,
wherein
a portion of each of the insulators or a resin component different from the insulators has a connection terminal insertion hole into which the tab terminal is inserted,
the connection terminal insertion hole on a winding start side of the winding of each phase is formed on a first circle centered on the shaft center of the stator,
the connection terminal insertion hole on a winding end side of the winding of each phase is formed on a second circle centered on the shaft center of the stator, and
the first circle and the second circle have different diameters.

8. The stator of a rotating electric machine of claim 7, wherein a plurality of the connection terminal insertion holes are formed on a same circle centered on the shaft center of the stator.

9. The stator of a rotating electric machine of claim 7, wherein portions of side walls surrounding the connection terminal insertion hole have at least a pair of grooves used for placing the winding, the side walls being opposite to each other, and the grooves are formed to be perpendicular to the plate surface of the tab of the tab terminal.

10. The stator of a rotating electric machine of claim 7, wherein an angle between
a line segment between the shaft center of the stator and a first connection terminal insertion hole of the connection terminal insertion holes on the winding start side, and
a line segment between the shaft center of the stator and a second connection terminal insertion hole of the connection terminal insertion holes on the winding end side
is same as an angle between
a line segment between the shaft center of the stator and a third connection terminal insertion hole of the connection terminal insertion holes on the winding start side, and
a line segment between the shaft center of the stator and a fourth connection terminal insertion hole of the connection terminal insertion holes on the winding end side.

11. The stator of a rotating electric machine of claim 7, wherein the connection terminal insertion hole on the winding start side and the connection terminal insertion hole on the winding end side have different heights.

12. A stator of a rotating electric machine comprising:
a stator core;
windings of multiple phases wound around the stator core via insulators attached to the stator core; and
tab terminals that each have at least one slit and a plate-shaped tab and that electrically connect an end portion of a winding, of one of the multiple phases, of the windings to an end portion of an other of the windings of a different one of the multiple phases,
wherein a portion of each of the insulators or a resin component different from the insulators has a connection terminal insertion hole into which the tab terminal is inserted,
the connection terminal insertion hole is formed on a circle centered on a shaft center of the stator, and a plate surface of the tab of the tab terminal to be inserted into the connection terminal insertion hole is placed to be tangential to the circle, and
the connection terminal insertion hole on the winding start side and the connection terminal insertion hole on the winding end side have different heights.

13. The stator of a rotating electric machine of claim 12, wherein a plurality of the connection terminal insertion holes are formed on a same circle centered on the shaft center of the stator.

14. The stator of a rotating electric machine of claim 12, wherein the connection terminal insertion hole on a winding start side of the winding of each phase is formed on a first circle centered on the shaft center of the stator,
the connection terminal insertion hole on a winding end side of the winding of each phase is formed on a second circle centered on the shaft center of the stator, and
the first circle and the second circle have different diameters.

15. The stator of a rotating electric machine of claim 12, wherein portions of side walls surrounding the connection terminal insertion hole have at least a pair of grooves used for placing the winding, the side walls being opposite to each other, and the grooves are formed to be perpendicular to the plate surface of the tab of the tab terminal.

16. The stator of a rotating electric machine of claim 12, wherein an angle between
a line segment between the shaft center of the stator and a first connection terminal insertion hole of the connection terminal insertion holes on the winding start side, and a line segment between the shaft center of the stator and a second connection terminal insertion hole of the connection terminal insertion holes on the winding end side
is same as an angle between
a line segment between the shaft center of the stator and a third connection terminal insertion hole of the connection terminal insertion holes on the winding start side, and
a line segment between the shaft center of the stator and a fourth connection terminal insertion hole of the connection terminal insertion holes on the winding end side.

* * * * *